United States Patent
Fahey et al.

(10) Patent No.: US 10,187,358 B2
(45) Date of Patent: Jan. 22, 2019

(54) DATA TRANSFER OPTIMIZATIONS

(71) Applicant: Amazon Technologies, Inc., Reno, NV (US)

(72) Inventors: Sean Anthony Fahey, Seattle, WA (US); Brent James Hill, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/095,898

(22) Filed: Dec. 3, 2013

(65) Prior Publication Data

US 2015/0156174 A1   Jun. 4, 2015

(51) Int. Cl.
*H04L 29/06* (2006.01)
*H04L 29/08* (2006.01)

(52) U.S. Cl.
CPC .......... *H04L 63/0428* (2013.01); *H04L 63/18* (2013.01); *H04L 67/06* (2013.01); *H04L 67/1097* (2013.01)

(58) Field of Classification Search
CPC ........... H04L 2209/125; H04L 67/1097; H04L 67/06; H04L 63/0428; H04L 63/0435; H04L 63/18
See application file for complete search history.

(56) References Cited

U.S. PATENT DOCUMENTS

| | | |
|---|---|---|
| 5,835,599 A | 11/1998 | Buer |
| 7,774,316 B2 | 8/2010 | Breau et al. |
| 8,355,499 B2 * | 1/2013 | Asnaashari ............... H04L 9/28 380/28 |
| 8,468,439 B2 | 6/2013 | Kirkpatrick |
| 2002/0138504 A1 | 9/2002 | Yano et al. |
| 2004/0019783 A1 * | 1/2004 | Hawkes ................ H04L 9/0637 713/161 |

(Continued)

FOREIGN PATENT DOCUMENTS

| | | |
|---|---|---|
| CN | 102546607 A | 7/2012 |
| JP | H10075240 A | 3/1998 |

(Continued)

OTHER PUBLICATIONS

Jacquin, L., et al., "Parallel Arithmetic Encryption for High-Bandwidth Communications on Multicore/GPGPU Platforms," Proceedings of the 4th International Workshop on Parallel and Symbolic Computation, New York, New York, Jun. 23, 2010, 16 pages.

(Continued)

*Primary Examiner* — Hadi S Armouche
*Assistant Examiner* — Alexander R Lapian
(74) *Attorney, Agent, or Firm* — Davis Wright Tremaine LLP

(57) ABSTRACT

Data transfer between a first computer system and a second computer system utilize parallel servers of the second computer system. A plurality of data chunks collectively comprise a data object. The data chunks may be encrypted and sent over parallel channels to the second computer system, which may be a data storage service of a computing resource service provider. The data object, or a portion thereof, may be downloaded from the data storage system in parallel.

20 Claims, 11 Drawing Sheets

(56) References Cited

U.S. PATENT DOCUMENTS

| | | | |
|---|---|---|---|
| 2007/0276951 A1* | 11/2007 | Riggs | H04L 63/0428 709/229 |
| 2008/0101598 A1* | 5/2008 | Dillaway | H04L 63/20 380/44 |
| 2009/0307249 A1* | 12/2009 | Koifman | G06F 3/0623 |
| 2010/0153747 A1 | 6/2010 | Asnaashari et al. | |
| 2011/0082945 A1* | 4/2011 | Myers | H04N 21/234327 709/231 |
| 2011/0225302 A1* | 9/2011 | Park | H04L 65/4084 709/227 |
| 2012/0041931 A1 | 2/2012 | Ross | |
| 2012/0144195 A1 | 6/2012 | Nair et al. | |
| 2012/0331088 A1* | 12/2012 | O'Hare | G06F 21/6227 709/214 |
| 2013/0064370 A1* | 3/2013 | Gouge | H04L 63/0428 380/255 |
| 2013/0287205 A1 | 10/2013 | Leech | |
| 2013/0290703 A1* | 10/2013 | Resch et al. | 713/155 |
| 2015/0033008 A1* | 1/2015 | Einarsson et al. | 713/150 |

FOREIGN PATENT DOCUMENTS

| | | | |
|---|---|---|---|
| JP | 2003244598 A | 8/2003 | |
| JP | 2006146294 A | 6/2006 | |
| JP | 2013045273 A | 3/2013 | |

OTHER PUBLICATIONS

International Search Report and Written Opinion dated Mar. 10, 2015, International Patent Application No. PCT/US2014/68234, filed Dec. 2, 2014.

"This is Dangerous! Wireless LAN Threat Part 2: WEP encryption is useless!," Network World 9(7):137-138, Jul. 1, 2004.

Canadian Notice of Allowance dated Mar. 16, 2018, Patent Application No. 2930876, filed Dec. 2, 2014, 1 page.

Japanese Final Office Action dated Apr. 9, 2018, Patent Application No. 2016-528066, filed Dec. 2, 2014, 2 pages.

Japanese Final Rejection dated Jul. 23, 2018, Patent Application No. 2016-528066, filed Dec. 2, 2014, 3 pages.

Chinese First Office Action dated Jun. 8, 2018, Patent Application No. 201480066659.5, filed Dec. 2, 2014, 16 pages.

* cited by examiner

DATA TRANSFER OPTIMIZATIONS

BACKGROUND

The need to transfer data is ubiquitous in modern computer systems. For example, data is often generated remotely from a location in which the data is stored. Sometimes, data needs to be transferred from one computer system to another for various purposes, such as processing, backup and the like. Further, as data capturing techniques become more advanced, the amount of data transferred is increasing. Modern computer networks, such as the Internet and mobile communications networks, provide complex and generally effective infrastructure for data transfer.

Despite this, however, various limitations impede the ability to transfer data from one point to another. For example, the transmission control protocol (TCP) limits the amount of data that can be sent or received before the data transfer must be acknowledged by both parties. The time it takes to acknowledge a packet is time not spent transferring. As another example, encrypting data before transfer can slow the transfer process based on the processing capabilities of the encrypting and/or decrypting system. Also, a receiving system may be limited in the rate at which it can receive data due to various factors, such as file server disk speed. In addition, conventional techniques for transferring data often heavily utilize some resources (processing ability, bandwidth, etc.) while leaving other resources underutilized.

BRIEF DESCRIPTION OF THE DRAWINGS

Various embodiments in accordance with the present disclosure will be described with reference to the drawings, in which.

DETAILED DESCRIPTION

Figure 1:
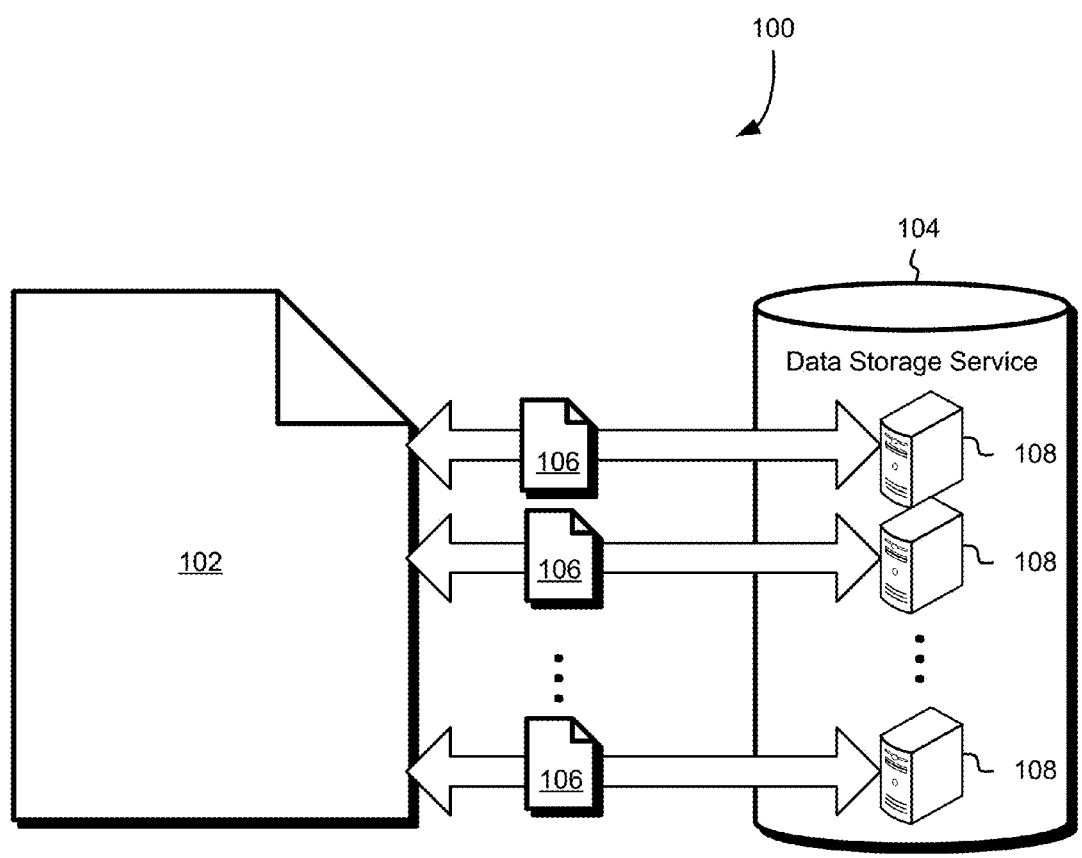
FIG. 1 shows a diagram illustrating various techniques of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include enabling efficient transmission of data between computer systems. In some examples, a client computer system transmits data to and/or from a data storage service. For instance, the data storage service may be operated by a computing resource service provider and the client computer system may be a computer system of a customer of the computing resource service provider. In other embodiments, however, the client computer system and the data storage service may be systems operated under the control of the same organization.

In various embodiments, a client computer system utilizes various parallelization techniques to efficiently transfer data to the data storage system. For example, the client computer system may deconstruct a data object into a plurality of data chunks (also referred to simply as "chunks") to be transmitted in parallel to the data storage service. Considering the data object as a sequence of bits, for instance, the data chunks may be consecutive subsequences of those bits, although more complex methods of deconstructing a data object into data chunks may also be used. The client computer system may also perform various data manipulation and other operations on the data chunks. In some examples, the client computer system separately encrypts each data chunk. Each data chunk may be encrypted, for example, using the same cryptographic key. In some instances, a cryptographic algorithm uses an initialization vector (such as a nonce) and a different initialization vector may be used for each data chunk. An initialization vector may be randomly or pseudorandomly (i.e., stochastically) generated for each data chunk or may be obtained for each data chunk in a non-random manner, such as by using obtaining initialization vectors sequentially from a sequence (e.g., a sequence of integers). The client computer system may also perform other operations on the data chunks in parallel, such as the computation of checksums, application of one or more data compression algorithms on the data chunks and/or other operations.

The client computer system may also utilize various parallelization techniques to transfer the data chunks to the data storage service. For example, in some embodiments, the client computer system sends different sets of data chunks to different servers of the data storage service. For instance, the client computer system may submit a separate upload request for each data chunk (or each set of a partitioning of the data chunks into sets). Each request may be initiated using the same service endpoint identifier (e.g., uniform resource locator (URL)) and the data storage service may respond to each initiation with a network address of a server to handle the request. In this manner, data may be transferred to the data storage service to overcome physical limitations of individual servers, such as the rate at which a single server is able to receive incoming data. Each encrypted data chunk may be transmitted to the data storage service with the initialization vector used to encrypt the data chunk, thereby enabling use of the initialization vector for later decryption.

In some embodiments, the data chunks are transmitted to the data storage service in a manner that causes the data storage service to treat the collection of encrypted data chunks (and, in some embodiments, initialization vectors) as a single data object. For example, the data storage service may associate the encrypted data chunks (and possibly initialization vectors) with a single identifier (which may comprise multiple pieces of information such as a logical data container name unique in the data storage system and object identifier unique within the logical data container). As another example, the collection may be downloadable from the data storage service as a single data object, which may comprise a concatenation of the encrypted chunks and, in some embodiments, the initialization vectors. The requests to transmit the encrypted data chunks to the data storage service may be configured so that the data storage system makes the association and/or otherwise treats the collection as a single data object.

Other features and variations considered as being within the scope of the present disclosure, including those discussed in greater detail below, provide numerous technical advantages over conventional techniques for transferring data. For example, utilization of the various techniques described herein improves transfer reliability since each transferred data chunk is a separate file transfer. Thus a failure to transfer a chunk, which may be evidenced by a checksum failing to match, only requires attempting retransmission of the data chunk and not the complete data object. Thus, data transfer is not only faster, but more resilient.

FIG. 1 shows a diagram 100 illustrating various aspects of the present disclosure. As illustrated in FIG. 100 the diagram 100 shows a data object 102 which may be a file or other collection of data. Various aspects of the present disclosure allow for storage of the data object 102 in a data storage service 104. In various embodiments of the present disclosure the data object is deconstructed into a plurality of data chunks 106. Each data chunk 106 may contain a portion of the data corresponding to the data object 102. For example, in some embodiments each data chunk 106 corresponds to a sequence of bits of the data object 102. Generally, the data chunks 106 may collectively comprise data usable to construct the data object 102, although each single data chunk 106 may individually lack all the data of the data object 102.

As illustrated in FIG. 1, various aspects of the present disclosure provide for efficient transfer to the data storage service 104 over a network such as the internet. As illustrated in FIG. 1, the data storage service 104 may receive data chunks in parallel over multiple communication channels. For instance, multiple servers 108 of the data storage service 104 may simultaneously receive the chunks 106. In this manner, gathering through-put is achievable relative to through-put achievable if the data object 102 was transferred to a single server 108. It should be noted, however, that while FIG. 1 illustrates all of the data chunks 106 being provided to the data storage service 104 in parallel, various embodiments of the present disclosure also include embodiments where some of the data chunks 106 are transferred in parallel and others are transferred in sequence. For example, transfer of the data chunks 106 may involve the transfer of N data chunks to M servers, where N and M are integers with M less than N. In this manner, at least some of the data chunks may be transferred in series while some are transferred in parallel.

As discussed in more detail below, parallelization may also be utilized for the purpose of performing various operations in connection with the data chunks 106 such as encryption and verification of error free transmission such as through the use of parallel calculation of and/or verification of checksums.

Figure 2:
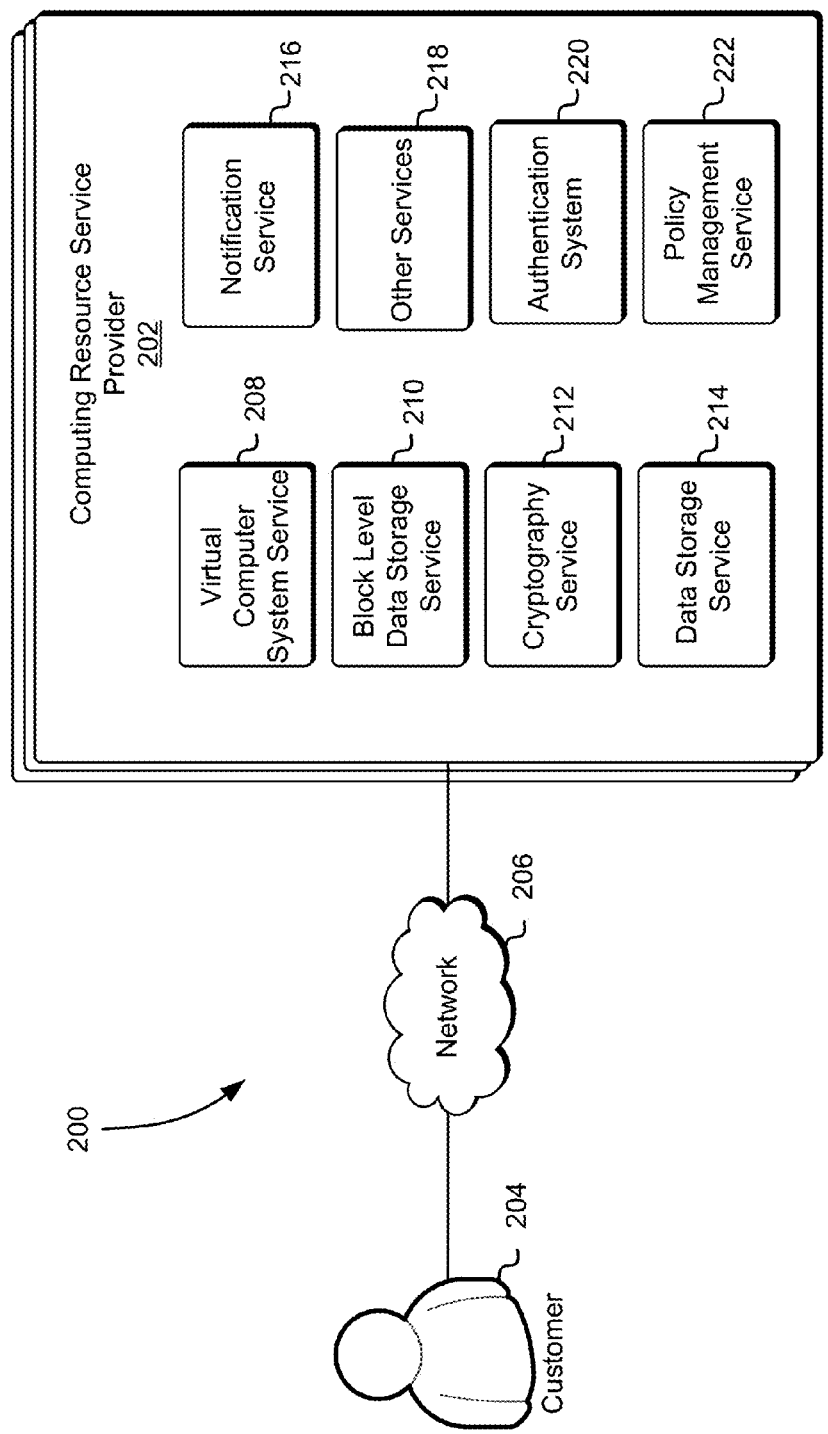
FIG. 2 shows an illustrative example of an environment in which various embodiments may be practiced.

FIG. 2 shows an illustrated example of an environment 200 in which various embodiments of the present disclosure may be practiced. In the environment 200, a computing resource service provider 202 may provide a variety of services to a customer 204. The customer 204 may be an organization that may utilize the various services provided by the computing resource service provider 202 to maintain and deliver information to its employees, which may be located in various geographical locations. Additionally, the customer 204 may be an individual that could utilize the various services to deliver content to a working group located remotely. As illustrated in FIG. 2, the customer 204 may communicate with the computing resource service provider 202 through one or more communications networks 206, such as the Internet. Some communications from the customer 204 to the computing resource service provider 202 may cause the computing resource service provider 202 to operate in accordance with various techniques described herein or variations thereof.

As noted above, a computing resource service provider 202 may provide various computing resource services to its customers. The services provided by the computing resource service provider, in this example, include a virtual computer system service 208, a block-level data storage service 210, a cryptography service 212 (also referred to as a key management service), a data storage service 214 and one or more other services 216, although not all embodiments of the present disclosure will include all such services and additional services may be provided in addition to or as an alternative to services explicitly described herein. Each of the services may include one or more web service interfaces that enable the customer 204 to submit appropriately configured API calls to the various services through web service requests. In addition, each of the services may include one or more service interfaces that enable the services to access each other (e.g., to enable a virtual computer system of the virtual computer system service 208 to store data in or retrieve data from the data storage service and/or to access one or more block-level data storage devices provided by the block data storage service).

The virtual computer system service 208 may be a collection of computing resources configured to instantiate virtual machine instances onto virtual computing systems on behalf of the customers 204 of the computing resource service provider 202. Customers 204 of the computing resource service provider 202 may interact with the virtual computer systems' service (via appropriately configured and authenticated API calls) to provision and operate virtual computer systems that are instantiated on physical computing devices hosted and operated by the computing resource service provider 202. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications.

The block-level data storage service 210 may comprise a collection of computing resources that collectively operate to store data for a customer 204 using block-level storage devices (and/or virtualizations thereof). The block-level storage devices of the block-level data storage service 210 may, for instance, be operationally attached to virtual computer systems provided by the virtual computer system service 208 to serve as logical units (e.g., virtual drives) for the computer systems. A block-level storage device may enable the persistent storage of data used/generated by a corresponding virtual computer system where the virtual computer system service 208 may only provide ephemeral data storage.

As illustrated in FIG. 2, the computing resource service provider 202 may operate a cryptography service, which is described in more detail below in connection with FIG. 3. Generally, the cryptography service may be a collection of computing resources collectively configured to manage and use cryptographic keys for customers of the computing resource service provider. Keys used by the cryptography service 212 may have associated identifiers that the customers can reference when submitting requests to perform cryptographic operations (such as encryption, decryption and message signing) and/or other operations, such as key rotation. The cryptography service may securely maintain the cryptographic keys to avoid access by unauthorized parties.

As noted, the computing resource service provider 202 may also include one or more data storage services 214 which may include an on-demand data storage service and/or an archival data storage service. As on-demand data storage service may be a collection of computing resources configured to synchronously process requests to store and/or access data. The on-demand data storage service may operate using computing resources (e.g., databases) that enable the on-demand data storage service 208 to locate and retrieve data quickly, so as to allow data to be provided in responses to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service may be organized into data objects. The data objects may have arbitrary sizes except, perhaps, for certain constraints on size. Thus, the on-demand data storage service may store numerous data objects of varying sizes. The on-demand data storage service may operate as a key value store that associates data objects with identifiers of the data objects which may be used by the customer 204 to retrieve or perform other operations in connection with the data objects stored by the on-demand data storage service 210. The on-demand data storage service may also be accessible to the cryptography service 212. For instance, in some embodiments, the cryptography service utilizes the on-demand data storage service to store keys of the customers in encrypted form, where keys usable to decrypt the customer keys are accessible only to particular devices of the cryptography service 212. Access to the data storage service by a customer, another service, or other entity may be through appropriately configured API calls.

An archival storage system may operate differently than an on-demand data storage service. For instance, an archival storage system may be configured to store data in a manner that reduces the costs of storage at the expense of performance in connection with data access. As one illustrative example, the archival storage system may be configured to perform data operations (i.e., store and retrieve data) asynchronously to take advantage of cost savings afforded by batch processing and parallelism. For instance, a client of the archival storage system may receive requests to access data objects stored in the archival storage system, aggregate the requests, process the requests in batches and make the requested data available for retrieval using additional requests. Due to the asynchronous processing, the archival storage system may require another request to retrieve a data object once the data object has been made ready for retrieval, such as by reading the data object from one or more archival data storage devices and writing the data to one or more staging data storage devices from which the data object is available.

The on-demand storage system, on the other hand, may be configured to provide better performance with respect to data access. For example, the on-demand storage system may be configured to synchronously process requests to store and/or access data. To enable better performance relative to the archival storage system, the on-demand storage system may operate using additional computing resources (e.g., databases) that enable the on-demand storage system to locate and retrieve data quickly relative to the archival storage system. The on-demand storage system may provide synchronous data access. For example, the on-demand storage system may maintain stored data in a manner such that, when a request for a data object is retrieved, the data object can be provided (or streaming of the data object can be initiated) in a response to the request.

In the environment illustrated in FIG. 2, a notification service 216 is included. The notification service 216 may comprise a collection of computing resources collectively configured to provide a web service or other interface and browser-based management console that can be used to create topics customers want to notify applications (or people) about, subscribe clients to these topics, publish messages, and have these messages delivered over clients' protocol of choice (i.e., HTTP, email, SMS, etc.). The notification service may provide notifications to clients using a "push" mechanism without the need to periodically check or "poll" for new information and updates. The notification service may be used for various purposes such as monitoring applications executing in the virtual computer system service, workflow systems, time-sensitive information updates, mobile applications, and many others.

The computing resource service provider 202 may additionally maintain one or more other services 218 based on the needs of its customers 204. For instance, the computing resource service provider 202 may maintain a database service for its customers 204. A database service may be a collection of computing resources that collectively operate to run one or more databases for one or more customers 204. Customers 204 of the computing resource service provider 202 may operate and manage a database from the database service by utilizing appropriately configured API calls. This, in turn, may allow a customer 204 to maintain and potentially scale the operations in the database. Other services include, but are not limited to, object-level archival data storage services, services that manage and/or monitor other services and/or other services.

As illustrated in FIG. 2, the computing resource service provider 202, in various embodiments, includes an authentication system 220 and a policy management service 222. The authentication system, in an embodiment, is a computer system (i.e., collection of computing resources) configured to perform operations involved in authentication of users of the customer. For instance, one of the services may provide information from the users to the authentication service to receive information in return that indicates whether or not the user requests are authentic. Determining whether user requests are authentic may be performed in any suitable manner and the manner in which authentication is performed may vary among the various embodiments. For example, in some embodiments, users electronically sign messages (i.e., computer systems operated by the users electronically sign messages) that are transmitted to a service. Electronic signatures may be generated using secret information (e.g., a private key of a key pair associated with a user) that is available to both an authenticating entity (e.g., user) and the authentication system. The request and signatures for the request may be provided to the authentication system which may, using the secret information, compute a reference signature for comparison with the received signature to determine whether the request is authentic.

If the request is authentic, the authentication service may provide information to the service that the service can use to determine whether to fulfill a pending request and/or to perform other actions, such as prove to other services, such as the cryptography service, that the request is authentic, thereby enabling the other services to operate accordingly. For example, the authentication service may provide a token that another service can analyze to verify the authenticity of the request. Electronic signatures and/or tokens may have validity that is limited in various ways. For example, electronic signatures and/or tokens may be valid for certain amounts of time. In one example, electronic signatures and/or tokens are generated based at least in part on a function (e.g., a Hash-based Message Authentication Code) that takes as input a timestamp, which is included with the electronic signatures and/or tokens for verification. An entity verifying a submitted electronic signature and/or token may check that a received timestamp is sufficiently current (e.g., within a predetermined amount of time from a current time) and generate a reference signature/token using for the received timestamp. If the timestamp used to generate the submitted electronic signature/token is not sufficiently current and/or the submitted signature/token and reference signature/token do not match, authentication may fail. In this manner, if an electronic signature is compromised, it would only be valid for a short amount of time, thereby limiting potential harm caused by the compromise. It should be noted that other ways of verifying authenticity are also considered as being within the scope of the present disclosure.

The policy management service 222, in an embodiment, is a computer system configured to manage policies on behalf of customers of the computing resource service provider. The policy management service 222 may include an interface that enables customers to submit requests related to the management of policy. Such requests may, for instance, be requests to add, delete, change or otherwise modify policy for the customer or for other administrative actions, such as providing an inventory of existing policies and the like. The policy management service 222 may also interface with other services to enable the services to determine whether the fulfillment of a pending request is allowable according to policy corresponding to the customer for which the request was made. For example, when a service receives a request, the service (if it has not locally cached such information) may transmit information about the request (and/or the request itself) to the policy management system which may analyze policies for the customer to determine whether existing policy of the customer allows fulfillment of the request and provide information to the service according to the determination.

Figure 3:
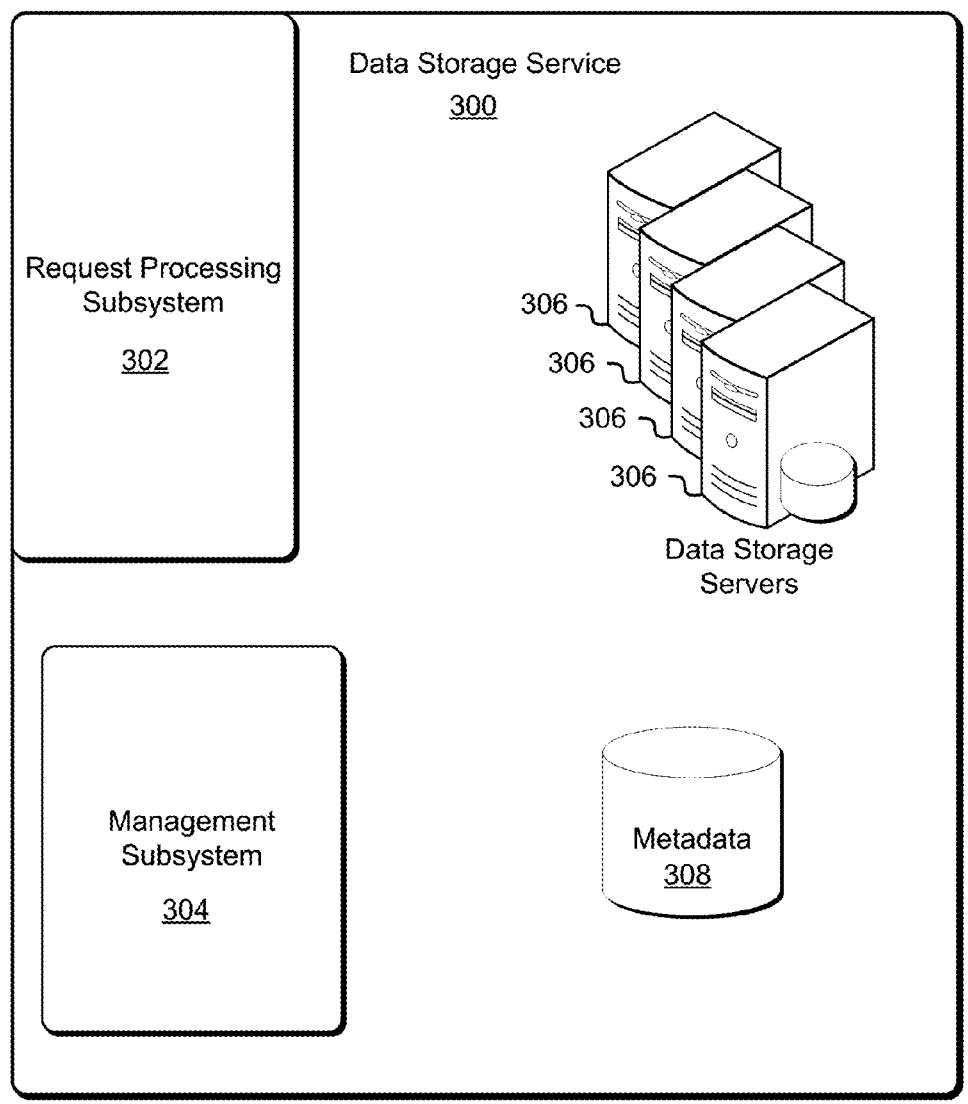
FIG. 3 shows an illustrative example of a data storage system in accordance with at least one embodiment.

FIG. 3 shows an illustrative example of a data storage service 300 in accordance with various embodiments. The data storage service may be a service of a computing resource provider used to operate an on-demand storage service such as described above in connection with FIG. 2. As illustrated in FIG. 3, the data storage service includes various subsystems such as a request processing subsystem 302 and a management subsystem 304. The data storage service 300 may also include a plurality of data storage servers 306 and metadata storage 308 which may store metadata about various data objects stored among the data storage servers 306 such as described in more detail below. In an embodiment, the request processing subsystem 302 is a collection of computing resources, such as webservers and application servers, collectively configured to process requests submitted to the data storage service 300. The request processing subsystem, for example, may include one or more webservers that provide a web service interface to enable customers of the data storage service 300 to submit requests to be processed by the data storage service 300. The request processing subsystem 302 may include computers systems configured to make various determinations in connection with the processing of requests, such as whether policy allows fulfillment of a request, whether requests are authentic (e.g., electronically signed using a suitable cryptographic key) and otherwise.

Components of the request processing subsystem may interact with other components of the data storage service 300 (e.g., through network communications). For example, some requests submitted to the request processing subsystem 302 may involve the management of computing resources which in this example may include data objects stored by the data storage servers 306. The request processing subsystem, for example, may receive and process requests to modify computing resources. For instance, in some examples, data objects are logically organized into logical data containers. Data objects associated with a logical data container may, for example, be said to be in the logical data container. Requests to the data processing subsystem may include requests for creating logical data containers, deleting logical data containers, providing an inventory of a logical data container, providing or updating access control policy with respect to one or more logical data containers and the like.

Such requests may be processed by the management subsystem 304 upon receipt by the request processing subsystem 302. If applicable, various requests processed by the request processing subsystem 302 and/or management subsystem 304, may result in the management subsystem 304 updating metadata about data objects and associated logical data containers stored in the metadata store 308. Other requests that may be processed by the request processing subsystem 302 include requests to perform operations in connection with data objects. Requests, for example, may include requests to upload data objects to the data storage service 300, to download data objects from the data storage service 300, to delete data objects stored by the data storage service 300, and/or other operations that may be performed.

Some operations may be performed in various ways. For example, as discussed in more detail below, the request processing subsystem 302 may provide multi-part upload and/or download capability in addition to single-part upload and download capability. Such capability may be advantageous, for example, in circumstance where data objects are relatively large. For instance, transmission of a particularly large data object using a single connection to server of the request processing subsystem 302, may result in a higher likelihood of a request failing due to the amount of data to be transferred. Multi-part upload and download capabilities may lessen the likelihood of such problems occurring by allowing data objects to be uploaded one part at a time. In this manner, if an upload or download of a single part fails, retransmission of that part need only occur for the part itself and not for the data object as a whole. Similarly, verification of a checksum by a receiving entity may be performed in parallel for different parts of a data object.

Requests processed by the request processing subsystem 302 that involve operations on data objects (upload, download, delete, e.g.) may include interaction between the request processing subsystem 302 and one or more data storage servers 306. The data storage servers 306 may be computer system communicatively coupled with one or more storage devices for the persistent of data objects. For example, in order to process a request to upload a data object, the request processing subsystem may transmit data to a data storage server 306 for persistent storage. It should be noted, however, that in some embodiments, client (e.g., customer) computer systems may transmit data directly to the data storage servers 306 instead of through severs in the request processing subsystem.

In some embodiments, the request processing subsystem 302 transmits data to multiple data storage servers 306 for the purposes of redundantly storing the data to allow the retrievability of data in the event of failure of an individual data storage server 306 and/or associated data storage device. For example, in some embodiments, the request processing subsystem uses a redundancy in coding scheme such as erasure coding to deconstruct a data object into multiple parts that are stored among the data storage servers 306. The parts may be configured such that if access to a certain number of parts is lost, the data object may be nevertheless be reconstructible from the remaining parts that remain accessible. Similarly, to process a request to download a data object or portion thereof, the request processing subsystem 302 may communicate with one or more of the data storage servers 306 to access the data stored thereby. For instance, in embodiments that utilize erasure coding for the purpose of data redundancy, the request processing subsystem may access data from a plurality of the data storage servers and reconstruct the data object from parts received from the data storage servers 306.

To enable efficient transfer of data between the request processing subsystem 302 and the data storage servers 306 and/or generally to enable quick processing of requests, the request processing subsystem may include one or more databases that enable the location of data among the data storage servers 306. For example, the request processing subsystem 302 may operate a key value store that serves to associate identifiers of data objects with locations among the data storage servers 306 for accessing data of the data objects.

Figure 4:
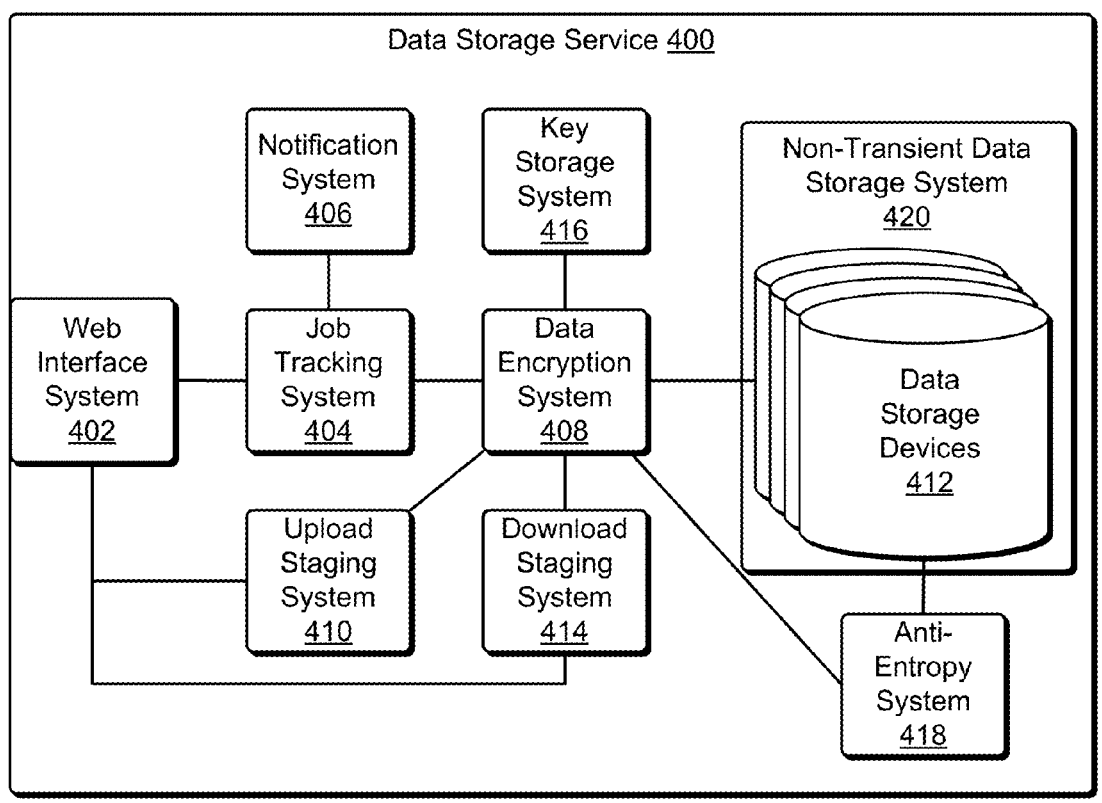
FIG. 4 shows an illustrative example of another data storage system in accordance with at least one embodiment.

FIG. 4 shows an illustrative example of a data storage service 400. The data storage service 400 may be for example the archival data storage service described above in connection with FIG. 2. That is, the data storage service 400 may be for example an archival data storage configured to archive data on behalf of one or more users such as customers of a computing resource service provider. As illustrated in FIG. 4, the data storage service 400 includes, in various embodiments, multiple subsystems which enable the services' operations. For example, in an embodiment, the data storage service 400 includes a web interface system 402, which may be a system comprising one or more web servers to which requests to the data storage service 400 may be submitted by users of the data storage service 400. Generally, the web interface system 402 may be any system configured to receive appropriately configured application programming interface (API) calls to the data storage service 400 for the purpose of causing the data storage service 400 to perform one or more operations in accordance with received API calls.

In various embodiments, the data storage service 400 performs one or more operations asynchronously, such as described above. For example, for some requests submitted to the web interface system 402, the data storage service 400 may provide results of fulfillment of the requests separately from responses to the requests. As an illustrative example, the data storage service 400 may receive to the web interface system 402 a request to retrieve a data storage object stored by the data storage service 400. The data storage service 400 may respond to the request with a response that does not include the requested data, but that may include other information such as information acknowledging the request had been submitted and/or information indicating that the request is to be processed by the data storage service 400. Example information, such as a job identifier, is described below. In these examples, once the data storage service 400 has made the requested data available, the data storage service 400 may provide the data such as in response to a separate request for the data.

As noted above, fulfillment of some types of requests by the data storage service 400 is performed asynchronously. In order to accomplish this, the data storage service 400 may include a job tracking system 404. The job tracking system 404 may be a computer system configured to perform various operations in connection with the tracking of fulfillment of certain types of requests to the data storage service 400 and, in particular, for requests that are fulfilled by the data storage service 400 asynchronously. As an example, when the data storage service 400 receives a request to the web interface system 402, if the request is of a type that is fulfilled asynchronously, the web interface system 402 may notify the job tracking system 404 of the request. Notification may be performed using an electronic communication over an internal network of the data storage service 400 from the web interface system 402 to the job tracking systems 404. The job tracking system 404 may generate an identifier for a job, which may be a workflow for processing the request. The identifier may be generated, for example, in a serial manner or in another manner. The job tracking system 404 may interact with one or more other components of the data storage service 400 in order to track fulfillment of requests for which the job tracking system 404 has initiated jobs.

When the job tracking system 404 detects completion of a job (e.g., detects completion of a workflow to obtain data and make the obtained data available for download), the job tracking system 404 may transmit an electronic message to a notification system 406 which may be a system configured to provide notifications of job completion to users of the data storage service. The notifications may be provided in any suitable manner such as by electronic communications to one or more specified recipients. The notification system 406 may also be configured that users of the data storage service 400 can subscribe to various notification topics and when a message is published to a topic to which a user has been subscribed the user may receive an electronic communication of the message. In this manner, for example, a customer may determine when a job has been completed and results of the job's completion, that is of a corresponding requests fulfillment, are available. In the example of a data retrieval job, for example, a user of the data storage service 400 may utilize a message from the notification system 406 to determine that data requested is available for download. The user may then submit a request to download the data that has been made available. It should be noted that one or more users that receive notifications are not necessarily, but can be, the same user that submitted a request to the web interface system 402 for which a corresponding job was created. Further, in various embodiments, a user that obtains from the data storage service 400 the results of a job may be, but is not necessarily, the same user that initially submitted to the data storage service 400 the request that caused the job to be practiced. For example, one user may request that data be made available for retrieval and another user may request and receive the data once the data has been made available.

As illustrated in FIG. 4, the data storage service 400 includes a data encryption system 408. The data encryption system 408 may be a computer system configured to coordinate the flow of data through various components of the data storage service 400, encrypting and/or decrypting data as appropriate, in order to enable processing of various workflows for processing requests submitted to the data storage service 400. For instance, when a request is submitted to the data storage service 400 to the web interface system 402 to upload a data object to the data storage service 400, the web interface system 402 may obtain the data object from the user that submitted the request and provide the data object to an upload staging system 410 which is an example of a transient data storage system that is configured to store data objects until the stored data objects are moved to longer term archival storage, illustrated FIG. 4 as a non-transient data storage system 420 comprising data storage devices 412. In particular, the upload staging system 410, an example of a transient data store, may hold uploaded data objects until the data encryption system 408 retrieves the data objects from the upload staging system 410, encrypts the data objects and transmits the encrypted data objects to the data storage devices 412 of the non-transient data storage system 420 for archival storage.

Similarly, the data storage service 400 may include a download staging system 414 which may be a computer system configured to store data objects until the data objects are retrieved by users of the data storage service 400. For example, when the data storage service 400 receives a request to the web interface system 402 to retrieve a data object that is stored in the data storage device 412, the data encryption system 408 may obtain encrypted data objects from the data storage devices 412, may decrypt the encrypted data objects and transmit the decrypted data objects to the download staging system 414. The user or another user may transmit a subsequent request to the web interface system 402 to download the data object from the download staging system 414. The download staging system 414 may then provide the data object to the web interface system 402 which then provides the data object to the user that requested the data object. It should be noted that once decrypted by the data encryption system 408 transmission of the data object does not necessarily occur with the data object in plaintext form. For example, data object may be re-encrypted for transmission over an SSL or other secure connection one or more times during the transmission of the data object to the user that requested the data object. In order to perform various encryption and decryption operations, the data encryption system 408 may operate in accordance with a key storage system 416 which is a system configured to store keys utilized by the data encryption system 408, such as described in more detail below.

In addition to the above components, the data storage service 400 may include an anti-entropy system 418. The anti-entropy system 418 may be a system configured to perform various anti-entropy operations in connection with the data storage system. Such operations may include, for example, reclaiming data storage space when the space is no longer needed to store data that was stored in the storage space. The anti-entropy system may also perform various operations to optimize storage efficiency and cost, such as rewriting data more efficiently. As discussed below, the anti-entropy system may, in various circumstances, be configured to encrypt content encryption keys stored by the data storage system. For instance, if a key encrypting key is compromised, the anti-entropy system may locate content encryption keys encrypted under the key encrypting key and encrypt the located keys using a new key encrypting key. The anti-entropy system 418 may operate in a manner that avoids interference with other operations of the data storage service 400, such as read and write operations performed as part of storing and retrieving data objects in/from the data storage service 400. For instance, the anti-entropy system 418 may begin and pause operations to avoid interference.

Figure 5:
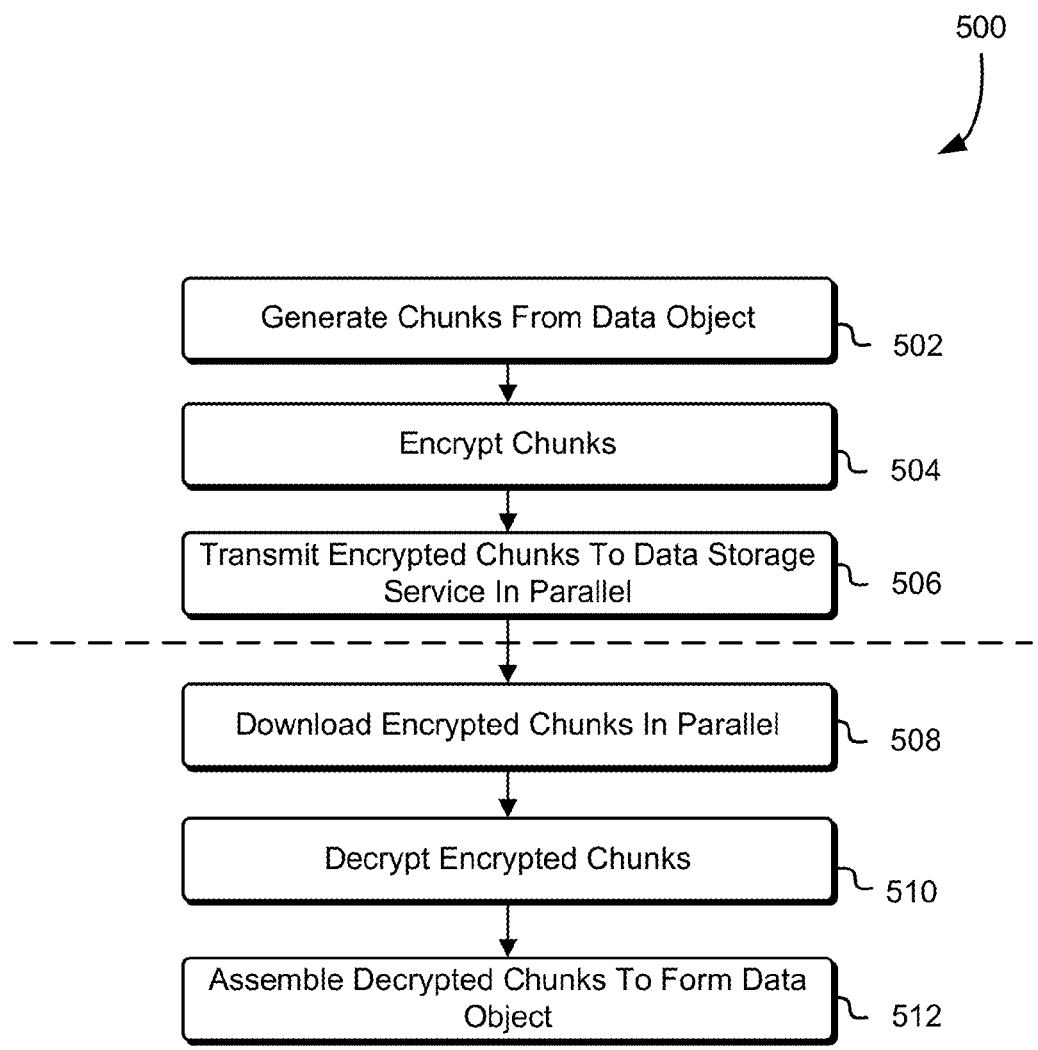
FIG. 5 shows an illustrative example of a process for transferring data in accordance with at least one embodiment.

FIG. 5 shows an illustrative example of a process 500 for transferring data in accordance with an embodiment. The process 500 may be performed by any suitable system. For example, in some embodiments the process 500 is performed by a client computer system of a system to and from which data is to be transferred. As an example, the process 500 may be performed by a customer computer system of a customer of a computing resource service provider. In some embodiments, the system performs the process 500 in accordance with executable code. For example, in some embodiments the computers system performing the process 500 may perform the process 500 in accordance with a Java or other client configured to cause the computers system to perform the process 500.

In an embodiment, the process 500 includes generating 502 a plurality of chunks from a data object. Generating 502 the chunks from the data object may be performed by deconstructing the data object into a plurality of parts that collectively, but not individually, contain all the data of the data object. For example, in some embodiments, the chunks may be generated as sequential subsequences of a sequence of bits that comprises the data object. The subsequences may be configured to have uniform size. Thus, the generated 502 chunks may all have uniform size except for a last sequence of bits if the size of the data object is not evenly divisible by the uniform size. It should be noted that while various examples of the present disclosure discuss various embodiments in connection with sequences of bits that can be concatenated to generate the data object, other ways of deconstructing a data object into chunks may be performed. For instance, as noted above, a data object may be deconstructed into parts using a redundancy in coding schemes such as erasure coding. A chunk may be one of the generated parts. It should also be noted that while chunks of uniform size except for a remainder chunk are utilized throughout the present disclosure, the techniques described herein are applicable to embodiments that utilize non-uniform chunk size, or where a data chunk of odd size appears in a different (e.g., leading) position in a sequence of bits. For example, the persistent storage of metadata about differing chunk sizes of non-uniformly sized chunks may enable the use of non-uniform chunk size. Other variations are also considered as being within the scope of the present disclosure.

As illustrated in FIG. 5 the process 500 includes encrypting 504 the generated chunks. The generated chunks may be encrypted 504 in any suitable manner. In some examples, each chunk is encrypted 504 using a symmetric key cryptographic cypher. That is a cypher that utilizes a cryptographic primitive that takes as input a key that is usable both to encrypt and decrypt. In some embodiments, the cryptographic cypher is non-parallelizable for encryption. In other words, the process of encryption may be configured such that the encryptions of various portions of the chunk cannot be performed by different processors in parallel. For instance, encryption of a chunk may include encrypting subportions, which may be referred to as blocks, of the chunk, where encryption of a block may depend on the result on encryption of a previous block. An example cryptographic cypher which is not parallelizable for encryption includes the block cypher chaining mode of the advanced encryption standard (AES-CBC). It should be noted that while various embodiments of the present disclosure discuss use of AES-CBC, other cryptographic cyphers may be used such as different modes of the advanced encryption standard (AES). In addition, while symmetric cryptosystems are used for the purpose of illustration, other types of cryptographic algorithms are considered as being within the scope of the present disclosure. For instance, the techniques described herein may be adapted to utilize public-key cryptosystems.

Some suitable cyphers such as AES-CBC utilize initialization vectors which may include randomly or pseudo-randomly (i.e., stochastically) generated values or other values that are not randomly generated. In many applications initialization vectors are also referred to as nonces. Accordingly, encrypting 504 the chunks may include generation and utilization of one or more initialization vectors. In some embodiments, a different initialization vector is utilized for each chunk that is encrypted. It should be noted that various embodiments may employ methods where there is a small but nonzero chance of the same initialization vector being used more than once (i.e., for encrypting more than one data chunk) during encryption. For instance, with randomly or pseudorandomly generated values used as initialization vectors, there is a nonzero chance of the same value being generated during a process for encrypting a set of data chunks corresponding to a data chunk. The probability of such an event occurring can be kept within acceptable levels by randomly or pseudorandomly generating values within a space of possible values of acceptable size. Generally, the probability of a repeated initialization vector used with the same cryptographic key can be kept within some acceptable level of probability.

It should also be noted also that in some embodiments encrypting 504 the chunks is done for at least some of the chunks in parallel. For instance, multiple processors of a multi-processor system (which may be a system comprising one or more multi-core processors) may, at the same time, perform encryption operations on different chunks. It should also be noted that while in some embodiments the cryptographic cypher utilized to encrypt 504 the chunks is non-parallelizable for encryption, the chunks may nevertheless be encrypted in parallel. In other words, a non-parallelizable cipher, such as AES-CBC, may be used by different processors at the same time.

In an embodiment, the process 500 includes transmitting 506 the encrypted chunks to a data storage service in parallel. Transmitting 506 the encrypted chunks to the data storage service in parallel may be performed in any suitable manner. For example, in some embodiments a separate upload request is submitted to the data storage service for each of the data chunks. In this manner the data storage service may facilitate multiple simultaneous connections between the system performing the process 500 and the web or other servers of the data storage service. It should be noted that while FIG. 5 illustrates transmitting 506 the encrypted chunks to the data storage service in parallel, transmission of the encrypted chunks may be performed such that some of the encrypted chunks are transmitted in parallel whereas other are transmitted in sequence. Further, other variations considered as being within the scope of the present disclosure include embodiments where encrypted data chunks are be combined to form larger data chunks, at least some of which are transmitted in parallel. Conversely, encrypted data chunks may be divided into smaller data chunks that are then transmitted individually to the data storage service, some of which being transmitted in parallel.

It should also be noted also that while FIG. 5 illustrates transmitted 506 the encrypted chunks to the data storage service, additional information may also be transmitted to the data storage service. For example, as noted, transmission may be pursuant to a web service request submitted to the data storage service. The web service request may include various parameters that indicate the type of request that provide information for authenticity and the like. In addition, as noted below, in some embodiments, one or more initialization vectors are used to encrypt the chunks. In such embodiments, the one or more initialization vectors may be transmitted with the chunks to be stored with the encrypted chunks by the data storage service so that the one or more initialization vectors may be used for decryption at a later time. Although, in some embodiments, initialization vectors may be stored separately from the chunks either by the data storage service or another system such as the system performing the process 500. In some embodiments, each chunk is transmitted with an initialization vector used to encrypt the chunk. For example, the initialization vector and the chunk may be concatenated together to form a sequence of bits (also referable to as a data chunk or chunk) that encodes both the data of the chunks and the initialization vector. An example is discussed below in connection with the FIG. 8. In this manner, when a chunk is downloaded at a later time the initialization vector can be extracted from the data that is downloaded.

At some point after uploading the chunks of the data object, the process 500 may include downloading data chunks from the data storage service. As illustrated by the dashed line in FIG. 5 the downloading may be performed asynchronously relative to uploading. It should be noted, however, that other operations illustrated and discussed in connection with the various figures also may be performed asynchronously relative to one another although illustrations of that are not necessarily shown. Returning to FIG. 5, a user may desire access to the data object and therefore may submit a request to access the data object from the data storage service. As illustrated in FIG. 5, the process 500, therefore, may include downloading 508 the encrypted chunks in parallel. It should be noted that as with encryption and/or transmission of the chunks, downloading of the chunks may be done so that some but not all the chunks are downloaded in parallel and others are downloaded in series. Further, as discussed above, the chunks may be stored with other data such as initialization vectors and therefore downloading 508 the encrypted chunks may also include downloading the other data that is included with the data chunks.

As illustrated in FIG. 5 the process may include decrypting 510 of the downloaded chunks where decrypting may be performed in any suitable manner and generally in accordance with the manner in which the data chunks were encrypted. For example, the same cryptographic key and initialization vector used to encrypt a chunk may be used to decrypt the chunk in accordance with the same cypher that was used to encrypt the chunk. It should be noted that while not illustrated in the figure, additional operations may be performed such as extracting the chunks from data that was downloaded from the data storage, for instance, by separating the data of the data object from the initialization vector stored with the chunk.

Returning to the operations illustrated in FIG. 5, the process 500 may include assembling 512 the decrypted chunks to form the data object. Assembling 512 the decrypted chunks to form the data object may be performed in any suitable manner and generally in accordance with the manner in which the data object was deconstructed. For example, as noted above, in some embodiments the data object is a sequence of bits and the chunks are successive subsequences of bits. Assembling the decrypted chunks may include, therefore, concatenating the subsequences of bits to form the data object. In other examples, a different type of processing may be performed such as applying an erasure coding scheme to reassemble the chunks into the data object. Generally, the assembly of the data chunks to form the data object may be in accordance with one or more methods used to deconstruct the data object.

As discussed above and as with all processes discussed herein, variations of the process 500 are considered as being within the scope of the present disclosure. For example, FIG. 5 illustrates a process whereby a data object is deconstructed and transmitted in parts to a data storage service. The parts are then possibly downloaded from the data storage service at a later time. Variations may include, for instance, downloading and assembling less than all of the data object. As an example discussed in more detail below, the data object may be a media file and only a portion of the media file may be downloaded in instances such as when playback of the media file is desired to be started at a point other than the beginning of the media file. Further, it should be noted that the process 500 may be adapted for data in general and the techniques discussed herein are not necessarily limited to data in the form of complete data objects in the sense that the data objects have a fixed size. The process 500 may be used, for example, to deconstruct and transmit to a data storage service data that does not have a fixed size such as data from a data set that changes over time, such as data that is streamed from one or more inputs (e.g., a video and/or audio capturing device). Other variations are also considered as being within the scope of the present disclosure.

Figure 6:
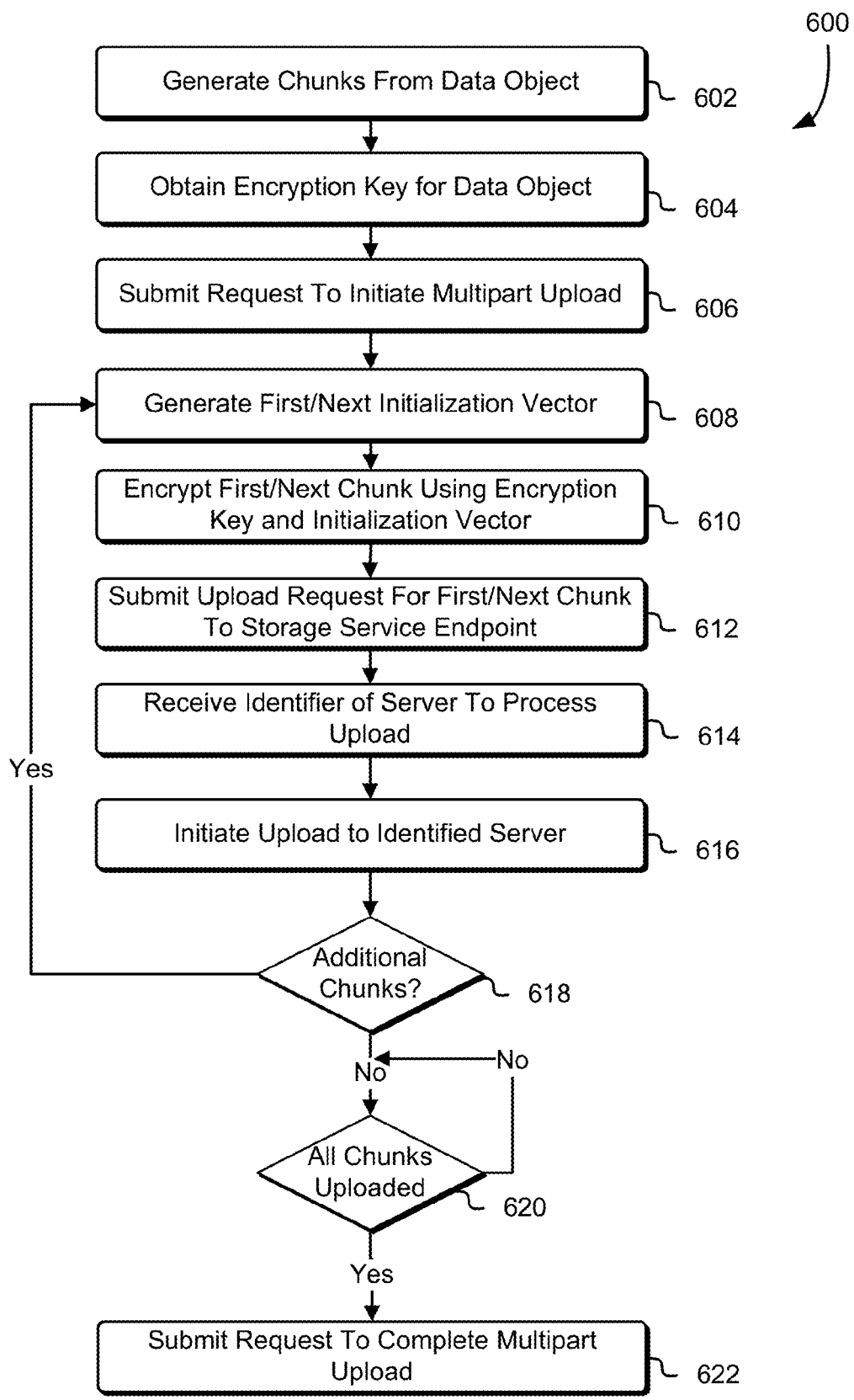
FIG. 6 shows an illustrative example of a process for uploading data in according with at least one embodiment.

FIG. 6 shows an illustrative example of a process for providing data to a data storage service in accordance with an embodiment. The process 600 may be performed by any suitable system such as the system that performs the process 500 as discussed above in connection with FIG. 5. In an embodiment, the process 600 includes generating 602 chunks from a data object. Generating chunks from the data object may be performed such as by dividing the data object into subsequences of bits. The process 600 may also include obtaining 604 an encryption key for the data object. Obtaining 604 the encryption key may be performed in any suitable manner, such as by obtaining the encryption key from volatile or non-volatile memory. For example, in some embodiments, the process 600 includes generating the encryption key randomly, pseudo-randomly, and/or in any suitable manner. In other embodiments, the encryption key may be obtained from another source. For example, in some embodiments the data storage service generates the encryption key and provides the encryption key to the system performing the process 600. In such embodiments where another entity provides the encryption key, the encryption key may be provided over a secure channel. For example, a secure key exchange protocol may be used to transfer the encryption key. As an example, a public-key cryptographic algorithm (cryptosystem) may be used to encrypt the encryption key using a public key held by the system performing the process 600. The system performing the process 600 may decrypt the encrypted encryption key using a private key corresponding to the public key used to encrypt the encryption key. Generally, any manner of transferring the encryption to the system performing the process 600 may be used.

In an embodiment, the process 600 includes submitting 606 a request to the data storage system to initiate a multi-part upload. The data storage service may, for instance, provide the ability to make an API call for initiating a multi-part upload and in response to the request to initiate multi-part upload may provide a response that includes an identifier usable across the different parts to be uploaded to the data storage service. Accordingly, while not illustrated in the figure, the process 600 may include receiving a response from the request to initiate the multi-part upload. As illustrated in FIG. 6, the process 600 may also include generating 608 a first initialization vector and encrypting 610 the first chunk using the encryption key and the initialization vector. It should be noted that the first chunk, but is not necessarily, the first in a series of chunks successively concatenatible to generate the data object. Mere use of the adjective "first" in the process 600 is intended to apply the first data chunk encrypted when performing the process 600.

Once the chunk has been encrypted 610, the process 600 may include submitting 612 an upload for the first chunk to a storage service endpoint which may be a web server of the data storage service configured to process the upload request. It should be noted that the storage service endpoint may be a different computer system than the computer system that received the request to initiate the multi-part upload. For example, in some embodiments, requests are submitted using a uniform resource locator (URL) of a data storage service which is resolvable to one or more web servers. The webserver that receives the request may provide in response an Internet Protocol (IP) address or other identifier for a server operable to process the request (e.g. by receiving the data to be uploaded). Different requests may result in different servers being identified, such as in accordance with one or more load balancing techniques. Thus, for instance, when performing the process 600, requests may be submitted to different physical server computer systems.

Accordingly, as illustrated in FIG. 6, the process 600 includes, in response to the uploaded request, receiving 614 an identifier of a server to process the upload. The upload may then be initiated 616 to the identified server. A determination may then be made 618 whether there are additional chunks to upload and, if determined 618 that there are additional chunks to upload, the process 600 may include generating 608 a next initialization vector and encrypting 610 the next chunk using the encryption key and the next initialization vector. An upload request may be submitted 612 such as described above and an identifier of a server to process for the next chunk may be received 614 such as described above. An upload to the identified server may then be initiated 616 and a determination may then be made 618 whether there are additional chunks. If determined that there are additional chunks, certain operations may repeat such as illustrated in FIG. 6 and described above until it is determined 618 that there are no additional chunks to be uploaded. The process 600 may then include monitoring the uploads that have been initiated and therefore making a determination 620 whether all chunks are uploaded repeatedly until determined 620 that all chunks have been uploaded. Once determined 620 that all chunks have been uploaded, the process 600 may include submitting 602 a request to complete the multi-part upload. The request may be submitted to the data storage service such as described above.

The data storage service may process the request to complete the multi-part upload by updating metadata for a data object (from the perspective of the data storage service)

and associating the data for the data object with an identifier for the data object. The data storage service may perform additional operations, such as collecting the uploaded chunks into a data object, applying a redundancy encoding scheme to the data object, and redundantly storing the data object in data storage. The data storage service, in some embodiments, applies a redundancy encoding scheme to each uploaded chunk separately.

Figure 7:
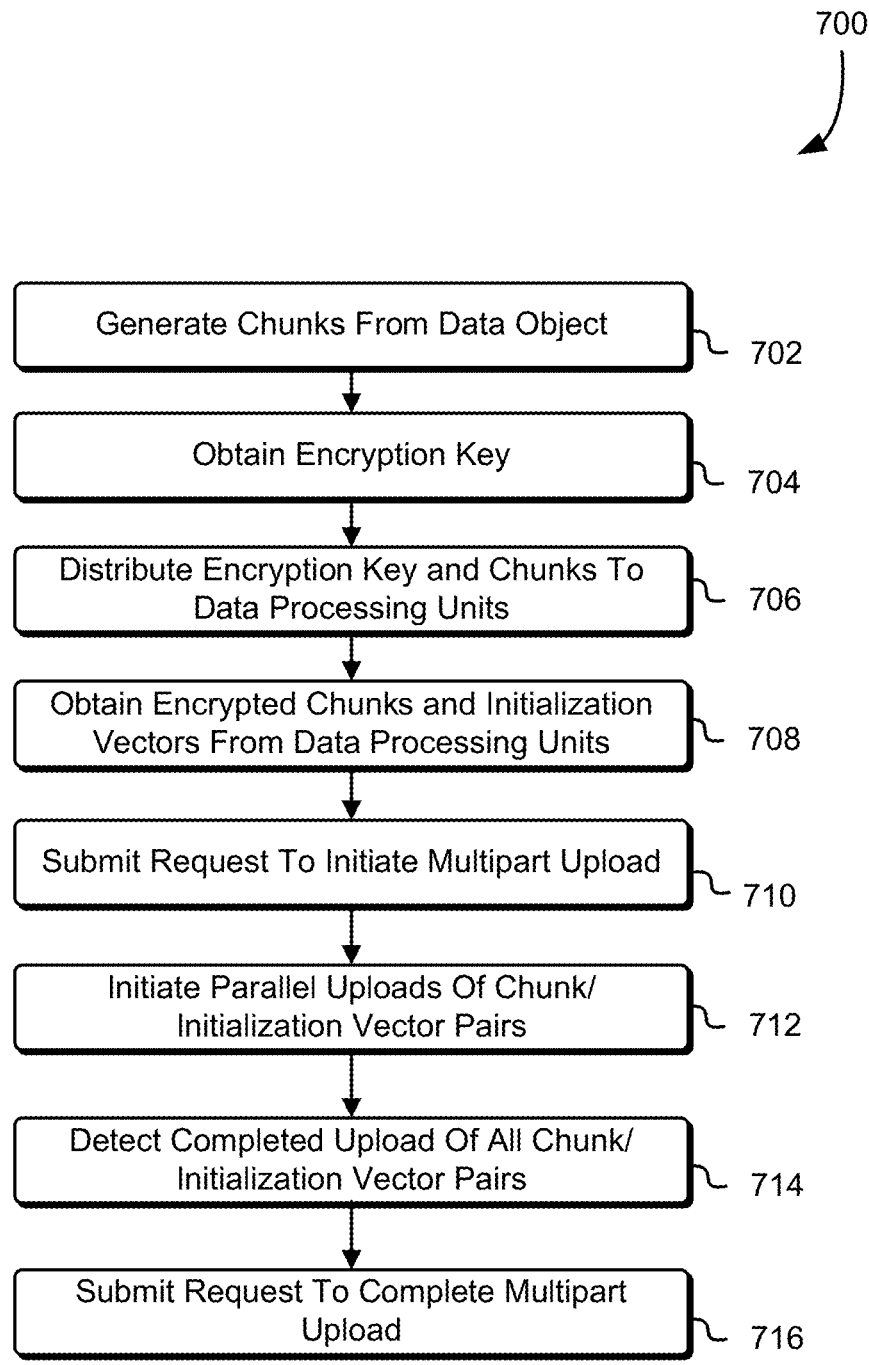
FIG. 7 shows an illustrative example of a process for uploading data in accordance with at least one embodiment.

As with all processes discussed herein, variations of the process 600 are considered as being within the scope of the present disclosure. For example, while not illustrated as such in FIG. 6, encryption of the chunks may be performed in parallel processes such as discussed above whereby some or all of the chunks of the data object are processed in parallel by the system performing the process 600 or perhaps by another system which may be a component of a distributed system. Other variations are also considered as being with the scope of the present disclosure such as those discussed above and below. Accordingly, FIG. 7 shows an illustrative example of a process 700 which may be used to transmit data to a data storage service such as described above. For example, the process 700 may be a variation of the process 600 described above in connection with FIG. 7 and may be performed by a suitable system accordingly.

As illustrated in FIG. 7, the process 700 includes generating 702 chunks from a data object such as described above. An encryption key may also be obtained 704 such as described above. As noted above, encryption of chunks of a data object may be performed in parallel. Accordingly, the process 700 includes distributing 706 the encryption key and chunks to a plurality of data processing units. The data processing units may be, for example, processors of a system performing the process 700. Data processing units may also be other computer systems in a distributed system. For example, the encryption key and chunks may be distributed over a network to a plurality of computer systems that may perform the encryption. Generally, the data processing units may be any processors or computer system capable of performing the encryption. Distributing 706 the encryption key in chunks to the data processing units may be performed in various ways which may depend on the number of chunks and the number of data processing units available. For example, in some embodiments, nonoverlapping subsets of the chunks are provided with the encryption key to the data processing units. As one illustrative example, if there are a thousand chunks four data processing units, such as four processors, distributing 706 the encryption key in chunks to the data processing units may include providing 250 chunks to each of the four available data processing units. Of course, other numbers of chunks and other numbers of data processing units are considered as being within the scope of the present disclosure.

The data processing units may encrypt the chunks, such as described above. For instance, each data processing units may use a different initialization vector for each chunk that it encrypts. Upon distribution 706 of the encryption key and the chunks to the data processing units, the process 708 may accordingly include obtaining 708 encrypted and initialization vectors from the data processing units. It should be noted that some embodiments do not utilize initialization vectors and accordingly the process 700 may be modified so as to exclude initialization vectors being provided from the data processing units. It should be noted that obtaining the encrypted chunks and initialization vectors from the data processing units may be performed in various ways in accordance with the various embodiments. For example, data processing units may provide encrypted chunks with initialization vectors upon completion of encryption of each chunk. As another example, a data processing unit may provide batches of encrypted chunks upon completion of a batch that is encryption of multiple chunks.

In an embodiment, the process 700 includes submitting 710 a request to initiate a multi-part upload such as described above. The process 700 may also include initiating 712 parallel uploads of chunk/initialization vector pairs. A chunk/initialization vector pair may be a collection of data comprising a chunk and initialization vector used to encrypt the chunk. As with all parallel processes described above, some chunks may be uploaded in parallel while others are uploaded in series. At some point, completion of the uploads may complete and therefore the process 700 may include detecting 714 a completed upload of all chunk/initialization vector pairs. For example, a system performing the process 700 may monitor each of the uploads and may detect completion of the uploads upon detecting completion of the last chunk/initialization vector pair to have a completed upload. Once completion of the upload of all chunk/initialization vector pairs the process 714 may include submitting 716 a request to complete the multi-part upload such as described above.

Figure 8:
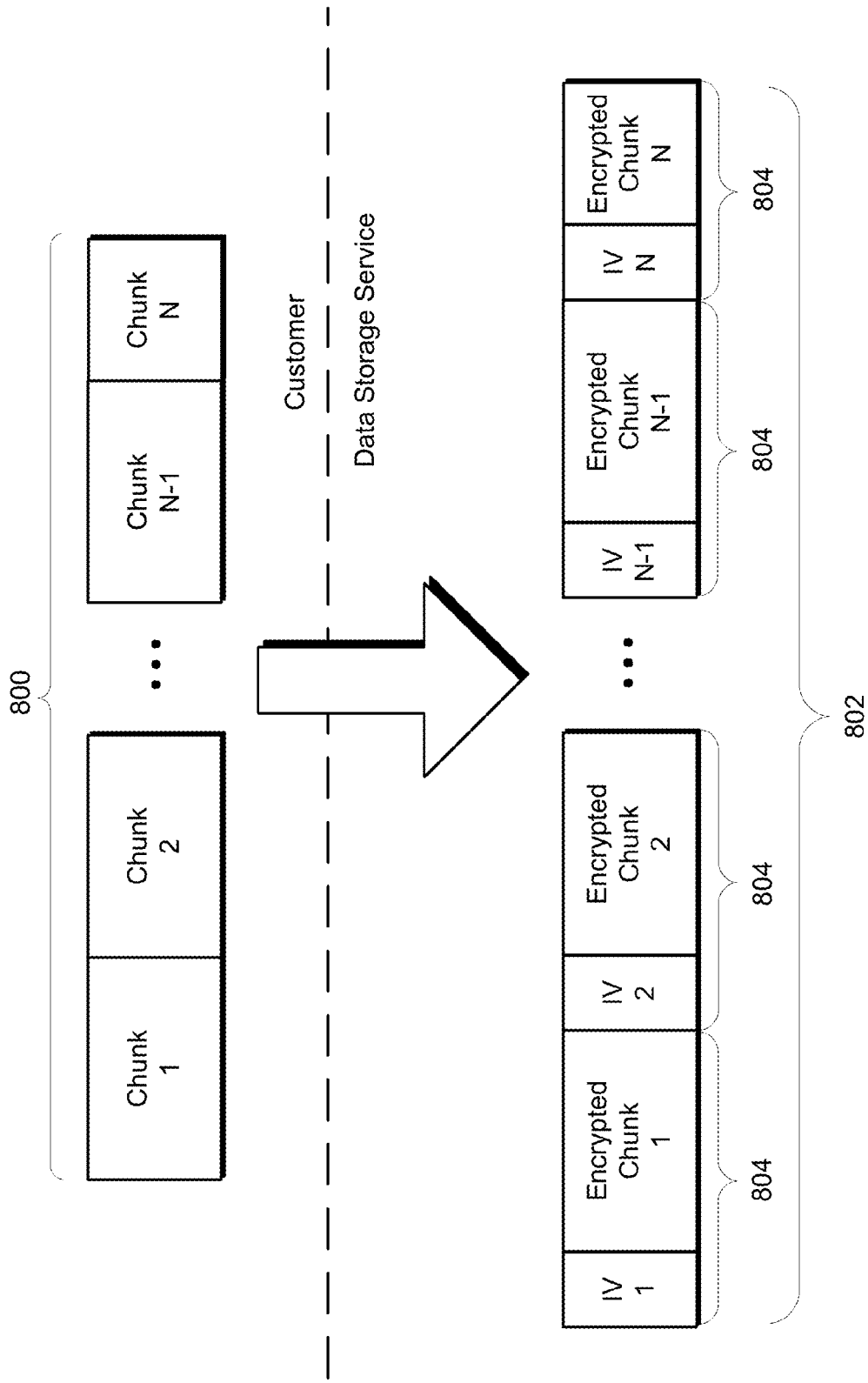
FIG. 8 is a diagram illustrating data transformation in accordance with at least one embodiment.

As noted above, various transformations of data may occur in performance of the various processes described herein. Such transformations may include, for example, encryption, although other transformations may also be included, such as compression, deduplication and other types of data transformations. FIG. 8 shows an illustrative demonstration of the transition between how a data subject is stored by a system that then sends the data object a data storage service. That is, FIG. 8 shows the difference in how the data object is stored in different systems, such as a customer computer system and a data storage service. As illustrated in FIG. 8, a data object may comprise a plurality of chunks. In this particular example, a data object 800 is comprised of an integer N number of chunks which may be, as discussed above, concatenated sequences of bits where all but the last sequence configured to be uniform size and the last chunk may have a different size if the size of the data object 800 is not evenly divisible by the size of the chunks.

Although it should be noted that variations of the techniques described herein may be utilized to have uniform chunk size. For example, additional bits such as zero bits may be added to a data object to give the data object a size that is evenly divisible by a uniform chunk size. Also, as noted above, various embodiments of the present disclosure do not necessarily utilize uniform chunk size, but may allow for non-uniform chunk size which may be enabled by the storage of additional metadata that allows for determining which bits belong to which chunks. Returning to FIG. 8, as illustrated in the figure, upon transformation and transmission of the data object 800 to a data storage service, the manner of which the data of the data object 800 is stored is different. In particular, as illustrated in FIG. 8 in various embodiments, the data storage service stores the data object 800 as a different data object 802 which contains different data than the data object 800, but that which is usable to obtain the data object 800.

As illustrated in FIG. 8, the data storage service stores the data object 802 as a collection of chunk/initialization vector pairs 804. In this particular example, each chunk/initialization vector pair 804 comprises the bits forming an initialization vector and the bits forming the encrypted chunk encrypted using the initialization vector concatenated together, although other arrangements are considered as being with the scope of the present disclosure. As illustrated in FIG. 8, the data storage service may operate as if the data object it stores 802 comprises a sequence of bits comprising the chunk/initialization vector pairs 804 concatenated together. For example, the data object 802 stored by the data storage service may be associated with an identifier usable to retrieve the data object 802 from the data storage service, such as by submitting a download request to the data storage service that specifies the identifier. In some examples, the identifier comprises an identifier of the logical data container and a identifier of a data object within the logical data container, although other arrangement are also considered as being within the scope of the present disclosure. Because the data storage service treats the data in the data object 802 as a data object the user may, for example, submit a request to the data storage service identifying the data object 802 and the data illustrated in FIG. 8 may be provided in the download as a single data object. The data of the data object may also be otherwise treated as a data object within the data storage service in other ways.

Figure 9:
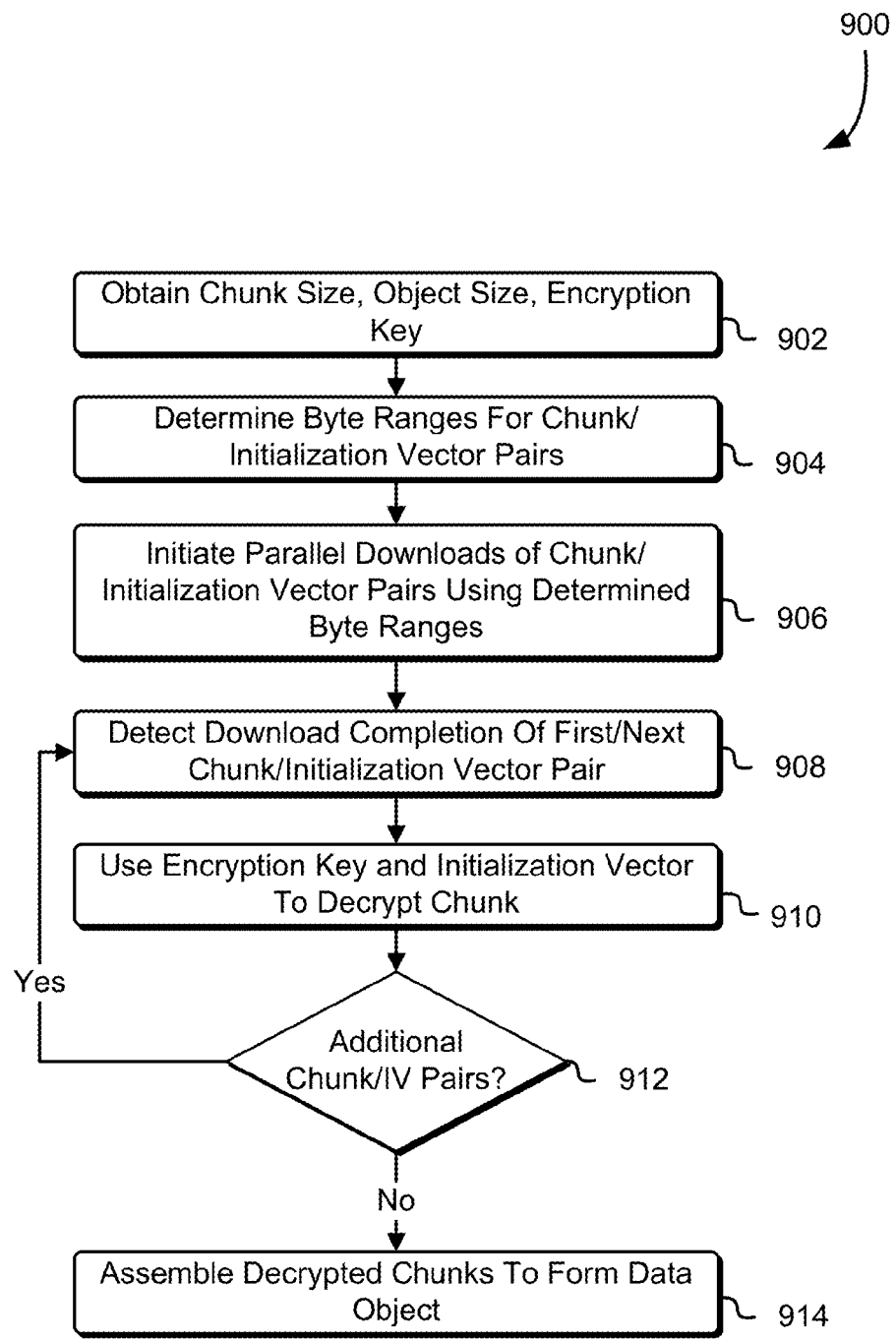
FIG. 9 shows an illustrative example of a process for downloading data in accordance with at least one embodiment.

FIG. 9 shows an illustrative example of a process 900 which may be used to obtain a data object from a data storage service in accordance with an embodiment. The data object may be stored in the data storage service upon performance of one of the processes described above and/or variations thereof. As illustrated in FIG. 9, the process 900 includes obtaining 902 a chunk size, object size, and encryption key. The chunk size, object size, and encryption key may be obtained in the same or in separate operations. In some examples, the object chunk, object size, and encryption key are stored as metadata such as in a metadata store described above. Obtaining the chunk size, object size, and encryption key may be performed by, for instance, submitting a request to obtain such data from the metadata storage. Other ways of obtaining the chunk size, object size, and encryption key may be performed such as by accessing such information from local or other remote storage. As illustrated in FIG. 9, the process 900 includes determining 904 byte ranges for chunk/initialization vector pairs. In the illustrative of FIG. 8, each of the chunk/initialization vector pairs may correspond to a sequence of bits forming the data object 802. The byte ranges can be determined by identifying ranges of length equal to the sum of the size of the initialization vector and the size of the encrypted chunk (i.e., the collective size of the chunk/initialization vector pair), starting at the first bit where a chunk/initialization vector begins (which may be the first bit if no additional data is stored in the leading bits). When calculating the byte ranges, the final chunk/initialization vector pair may correspond to a range that is smaller than ranges for other chunk/initialization pairs. Of course, different arrangements of data in other embodiments with other types of data stored may result in different ranges.

It should be noted that variations of the process 900 are within the scope of the present disclosure and that other information may be obtained and used to obtain the byte ranges. In an embodiment, the process 900 includes initiating 906 parallel downloads of chunk/initialization vector pairs using the determined byte ranges. Initiation of the parallel downloads may be performed, for example, by submitting separate requests to download different ranges of the data object 802 discussed above in connection with FIG. 8. The downloads of the various chunk/initialization vector pairs may be monitored and the download completion of the first chunk/initialization vector pair may be detected 908. Upon detection 908 of the download completion of the first chunk/initialization vector pair, the process 900 may include using 910 the encryption key and the initialization vector to decrypt the chunk. For example, in embodiments where the initialization vector and encrypted chunk are concatenated together, the initialization vector and encrypted chunk may be extracted from the concatenation and used to obtain the decrypted chunk.

A determination may be made 912 whether there are additional chunk/initialization vector pairs. If it is determined 912 that there are additional chunk/initialization vector pairs, the process 900 may include detecting 908 download completion of the next chunk/initialization vector pair and the encryption key and initialization from the next chunk/initialization vector pair may be used 910 to decrypt the corresponding chunk. This subprocess of the process 900 may repeat, as illustrated in FIG. 9, until it is determined 912 that there are no additional chunk/initialization vector pairs. At this point, the decrypted chunks may be assembled 914 to form the data object where assembly may vary in accordance with the varied embodiments according to the manner in which the data object was deconstructed to form the chunks.

As with all processes discussed herein, variations are considered as being with the scope of the present disclosure. For example, decryption may be performed in parallel and upon detection of download completions, the process 900 may include distributing the downloaded chunk to a data processing unit configured to decrypt the encrypted chunk. In addition, assembly 914 of the data object may begin before all the downloads have been completed. For example, the data object may be assembled in pieces as the data chunks are decrypted.

Figure 10:
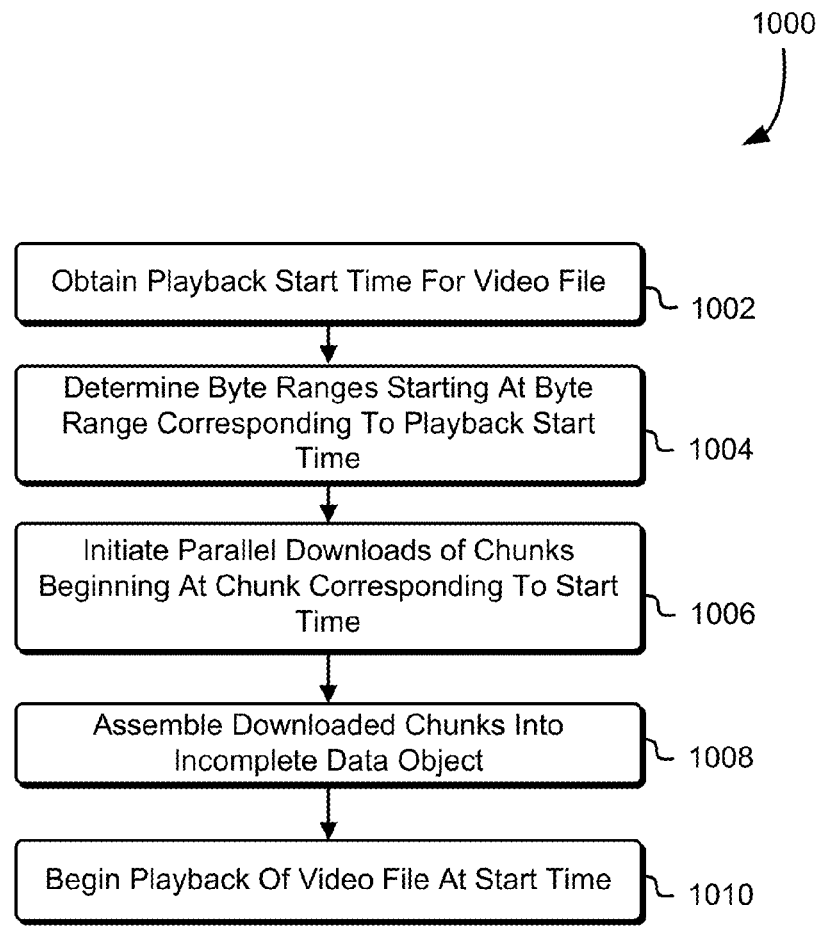
FIG. 10 shows an illustrative example of a process for playback of a remotely stored media file in accordance with at least one embodiment.

As noted above, variations of the present disclosure include those in which not all data of a data object is uploaded and/or downloaded. FIG. 10, accordingly, shows an illustrative example of a process 1000 for processing a media file. In the example of FIG. 10, the media file is a video file, although the process 1000 may be adapted for other types of media files such as audio files, and generally for other information sets of which a complete download is not desirable and/or necessary. Returning to FIG. 10, the process 1000, in an embodiment, includes obtaining 1002 a playback start time for a video file, where the playback start time may be a time at which a user desires playback of a video (or other media) file to begin. The playback start time may be the same as or different from a beginning time of the media file, where the beginning time may be the earliest time at which playback is can be started. For example, if the media file has a certain temporal length, the beginning time may correspond to zero minutes and zero seconds whereas the start time may correspond to a time after zero minutes, zero seconds. Obtaining 1002 the playback start time may be performed in any suitable manner. For example, a user, through interaction with a graphical user interface, may indicate a playback start time such as by graphically selecting a playback start time from a plurality of available start times. The start time may be obtained in other ways which do not necessarily involve explicit user selection of the start time. For example, if the user had begun watching the video file and then stopped, data may be stored that may indicate where the viewing of the video file has stopped. The start time may then be determined as, or otherwise based at least in part on, the stop time.

As illustrated in FIG. 10, the process 1000 may include determining 1004 byte ranges starting at a byte range corresponding to the selected start time. Determining 1004 the byte ranges may be performed in various ways in accordance with various embodiments which may depend on the manner in which the video file was encoded. In some embodiments, a mapping is maintained between data chunks and times in the video file. Each date chunk may be associated, for example, with a time in the video file at which the data chunk can be used to begin playback. As another example, the byte ranges can be determined by generating a linear relationship between the length of the video file that is the time in which the video file plays and the amount of data comprising the video file which may exclude metadata of the video file. The linear relationship may be used to generate an estimate for which byte range corresponds to the selected start time. The estimate may be used as a seed for a process for selecting the correct data chunk. For example, if the estimated chunk encodes times before the start time, a subsequent chunk may be obtained and checked. Similarly, if the estimated chunk encodes times after the start time, an earlier chunk may be obtained and checked until the chunk corresponding to the start time is found.

Upon determining 1004 the byte ranges starting at the byte range corresponding to the start time, the process 1000 may include initiating 1006 parallel downloads of chunks beginning at the chunk corresponding to the start time. Once chunks are downloaded, the downloaded chunks may be assembled 1008 to form an incomplete data object and playback of the video file may begin 1010 at the start time. It should be noted that playback of the video at the start time does not necessarily occur after download and/or assembly of all the chunks. For example, once enough data chunks are downloaded to fill a buffer comprising enough data to begin viewing the video file at the selected start time, playback may begin while additional chunks are being downloaded and assembled. It should be noted that while not illustrated in the figure, other operations such as encryption, decryption, and other processing may occur in accordance with the performance of the process 1000 illustrated in FIG. 10.

Figure 11:
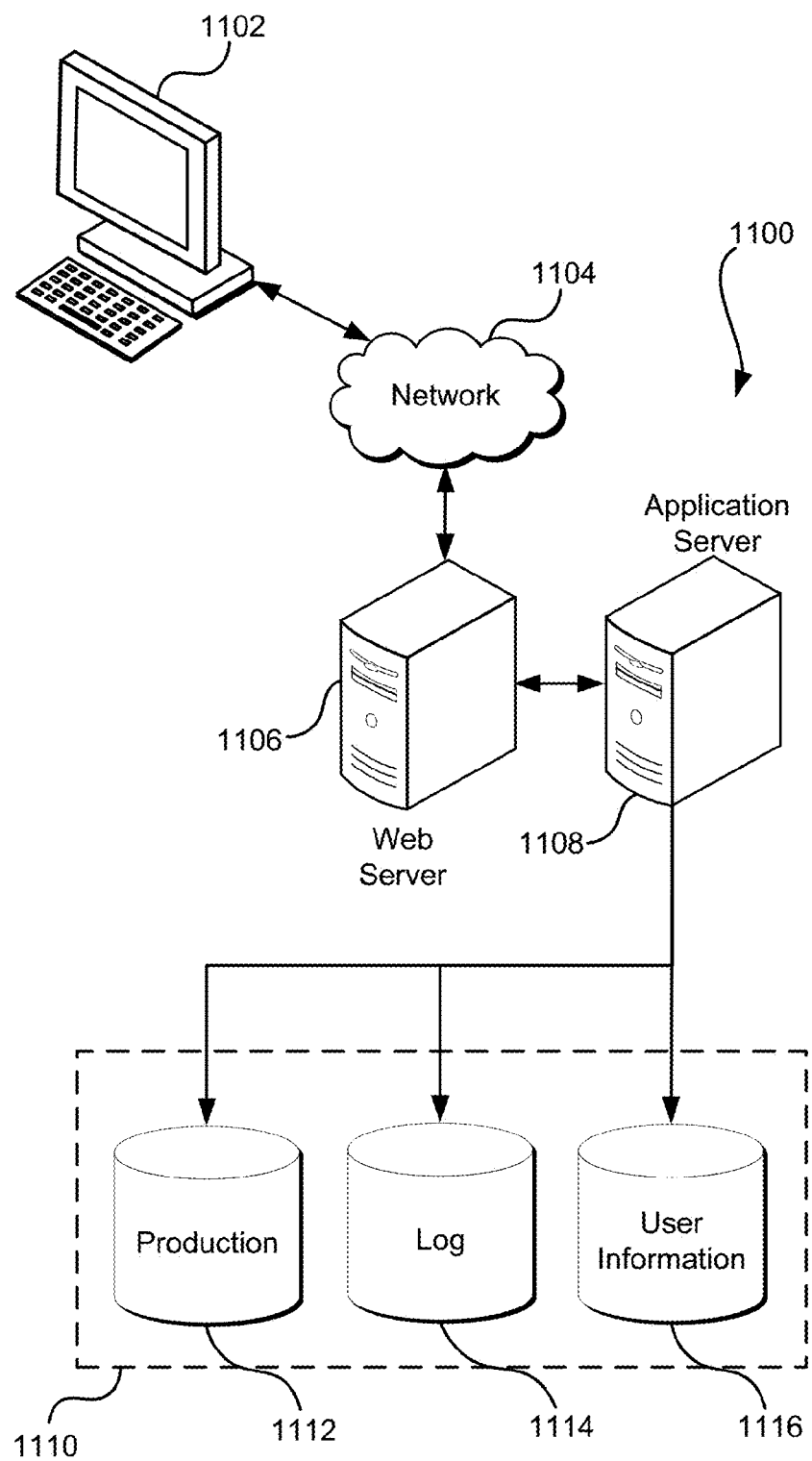
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1102 and the application server 1108, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1110 can include several separate data tables, databases or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation, those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A non-transitory computer-readable storage medium having stored thereon instructions that, upon execution by one or more processors of a computer system, cause the computer system to:
   encrypt a plurality of data chunks of a data object with a cryptographic key, wherein the data object is a media file such that:
      a first data chunk of the plurality of data chunks is encrypted so as to overlap with encryption of a second data chunk of the plurality of data chunks; and
      a subset of the plurality of data chunks is encrypted by the cryptographic key using a first initialization vector that is different than a second initialization vector used to encrypt a different subset of the plurality of data chunks, the first and second initialization vectors forming a set of initialization vectors;
   upload the first data chunk of the plurality of data chunks and the first initialization vector of the set of initialization vectors to an identified first server of a data storage service to at least:
      store a concatenated data chunk comprising the first data chunk and the first initialization vector;
      associate the concatenated data chunk with an identifier corresponding to the data object; and
      associate the concatenated data chunk with a second data chunk, the second data chunk stored on a second server of the data storage service of the plurality of data chunks;
   retrieve, in connection with a request to retrieve the data object from the data storage service, at least some of the plurality of data chunks in parallel, the request indicating a playback start time different from a beginning time of the media file; and
   decrypt at least some of the retrieved plurality of data chunks in parallel, the retrieved data chunks of the plurality of data chunks corresponding to a portion of the media file that includes the playback start time and lacks the beginning time.

2. The non-transitory computer-readable storage medium of claim 1, wherein the instructions that cause the transmitting of the plurality of data chunks and the set of initialization vectors further cause the computer system to transmit the first data chunk as a concatenated sequence of bits that includes a corresponding initialization vector of the set of initialization vectors.

3. The non-transitory computer-readable storage medium of claim 1, wherein the request specifies a range of bytes on at least one of the first server or the second server corresponding to a data chunk of the plurality of data chunks.

4. A non-transitory computer-readable storage medium having stored thereon instructions that, upon execution by one or more processors of a computer system, cause the computer system to:
    encrypt a plurality of data chunks of a data object, wherein the data object is a media file such that:
        a first data chunk of the plurality of data chunks is encrypted so as to overlap with encryption with a second data chunk of the plurality of data chunks;
        a subset of the plurality of data chunks is encrypted using a first initialization vector that is different than a second initialization vector used to encrypt a different subset of the plurality, the first and second initialization vectors forming a set of initialization vectors; and
        wherein each of the plurality of data chunks is encrypted using a same cryptographic key;
    transmit the first data chunk of the plurality of data chunks and the first initialization vector of the set of initialization vectors to an identified first server of a plurality of servers to at least:
        store a first concatenated data generated by combining the first data chunk of the plurality of data chunks with a corresponding first initialization vector of the set of the initialization vectors;
        associate the first concatenated data with an identifier corresponding to the data object; and
        associate the first concatenated data with the second data chunk, the second data chunk stored on a second server of a data storage service of the plurality of data chunks;
    retrieve, in connection with a request to retrieve the data object and from the data storage service, at least some of the plurality of data chunks in parallel, the request indicating a playback start time different from a beginning time of the media file; and
    decrypt at least some of the plurality of data chunks in parallel, the retrieved data chunks of the plurality of data chunks corresponding to a portion of the media file that includes the playback start time and lacks the beginning time.

5. The non-transitory computer-readable storage medium of claim 4, wherein the instructions that cause the transmitting of the plurality of data chunks and the set of initialization vectors further cause the computer system to transmit the first data chunk as a concatenated sequence of bits that includes a corresponding initialization vector of the set of initialization vectors.

6. The non-transitory computer-readable storage medium of claim 4, wherein the instructions further cause the computer system to download, from the data storage service, a portion of the plurality of data chunks by, for each encrypted data chunk of the plurality of data chunks, submitting a request to the data storage service that specifies a range of data within the data object that contains the encrypted data chunk.

7. The non-transitory computer-readable storage medium of claim 6, wherein downloading the portion of the plurality of data chunks includes determining, based on a uniform data chunk size of at least some of the data chunks in the portion and a size of the data object, a plurality of ranges each corresponding to a data chunk of the portion.

8. A system, comprising:
    memory to store instructions, as a result of being executed by at least one or more processors, cause the system to at least:
        process a plurality of data chunks of a media file that collectively comprise a data object by distributing, among the one or more processors, the plurality of data chunks for processing such that at least some data chunks of the plurality of chunks are encrypted in parallel using a cryptographic key and a different respective initialization vector, the respective initialization vectors for the plurality of data chunks forming a set of initialization vectors;
        upload a first data chunk of the plurality of processed data chunks and a respective first initialization vector of the set of initialization vectors to an identified first server of a data storage service to at least:
            couple, the first data chunk of the plurality of processed data chunks with the respective first initialization vector of the set of initialization vectors to generate a first concatenated data chunk of a plurality of concatenated data chunks;
            associate the first concatenated data chunk with an identifier corresponding with the data object; and
            associate the first concatenated data chunk with a second data chunk, the second data chunk stored on a second server of the data storage service of the plurality of data chunks; and
        retrieve and decrypt in parallel, in response to a request indicating a playback start time different from a beginning time of the media file, at least some of the plurality of data chunks in decrypted form, wherein the retrieved and decrypted data chunks of the plurality of data chunks correspond to a portion of the media file that includes the playback start time and lacks the beginning time.

9. The system of claim 8, wherein the instructions further cause the system to:
    perform checksum operations on a subset of the plurality of processed data chunks in parallel; and
    cause results of the checksum operations to be used to verify transfer of the subset of the plurality of processed data chunks to the data storage service.

10. The system of claim 8, wherein processing each data chunk of the plurality of data chunks includes compressing the data chunk.

11. The system of claim 8, wherein a subset of the one or more processors are part of a multi-core central processing unit.

12. The system of claim 8, wherein transferring the plurality of processed data chunks to the data storage service is performed in a manner resulting in the data storage service storing the plurality of processed data chunks collectively as a second data object.

13. The system of claim 8, wherein:
    transferring each processed data chunk with a corresponding initialization vector includes transmitting first bits that form the processed data chunk and transmitting second bits that form the corresponding initialization vector to a corresponding server.

14. The system of claim 8, wherein the instructions further cause the system to:
selectively download a subset of the plurality of processed data chunks without downloading another subset of the plurality of processed data chunks; and
reconstruct the data object from the selectively downloaded subset.

15. A computer-implemented method, comprising:
processing a data object into a first plurality of data chunks, wherein the data object is a media file;
processing the first plurality of data chunks to generate a second plurality of data chunks such that each data chunk of the first plurality of data chunks is encrypted in parallel using a cryptographic key and a different initialization vector;
uploading the first data chunk of the second plurality of data chunks and a first initialization vector of a set of corresponding initialization vectors to an identified first server of a data storage service to at least:
couple a first data chunk of the second plurality of data chunks with the first initialization vector of the set of initialization vectors to generate a concatenated data chunk base;
store, over at least a partially overlapping period of time, the concatenated data chunk and a second concatenated data chunk on the first server and a second server of the data storage service, respectively;
associate the concatenated data chunk with an identifier corresponding to the data object; and
associate the concatenated data chunk with a data chunk, the data chunk stored on the second server of the data storage service of the second plurality of data chunks; and
retrieve and decrypt, in response to a request indicating a playback start time different from a beginning time of the media file to retrieve the data object in decrypted form, at least some of the plurality of data chunks in parallel, wherein the retrieved and decrypted data chunks of the plurality of data chunks correspond to a portion of the media file that includes the playback start time and lacks the beginning time.

16. The computer-implemented method of claim 15, wherein the transmitting includes transmitting first bits that form the encrypted data chunk and transmitting second bits that form the corresponding initialization vector to a corresponding server.

17. The computer-implemented method of claim 15, wherein the first plurality of data chunks and the second plurality of data chunks include the same number of members.

18. The computer-implemented method of claim 15, wherein processing the first plurality of data chunks includes encrypting at least a subset of the first plurality of data chunks in parallel.

19. The computer-implemented method of claim 18, wherein processing the first plurality of data chunks includes utilizing a non-parallelizable cryptographic primitive.

20. The computer-implemented method of claim 15, further comprising downloading in parallel each data chunk of at least a subset of the second plurality of data chunks.

* * * * *